H. KORRODI.
GUN SIGHT.
APPLICATION FILED FEB. 1, 1910.

985,181.

Patented Feb. 28, 1911.

UNITED STATES PATENT OFFICE.

HEINRICH KORRODI, OF ESSEN-ON-THE-RUHR, GERMANY, ASSIGNOR TO FRIED. KRUPP AKTIENGESELLSCHAFT, OF ESSEN-ON-THE-RUHR, GERMANY.

GUN-SIGHT.

985,181.        Specification of Letters Patent.        Patented Feb. 28, 1911.

Application filed February 1, 1910. Serial No. 541,324.

*To all whom it may concern:*

Be it known that I, HEINRICH KORRODI, a citizen of Switzerland, and a resident of Essen-on-the-Ruhr, Germany, have invented certain new and useful Improvements in Gun-Sights, of which the following is a specification.

The present invention relates to a sight with a bar-shaped glass body (collimator) having arranged on one of its end surfaces, sighting marks which permit an unobstructed observation, and the purpose of the invention is to provide a sight of this kind of greatest simplicity and cheapest production and one which will enable the observer to observe at one and the same time, the sighting mark, the target and the greatest possible extent of target surroundings. These purposes are attained, according to the invention, by providing the glass body with an upper surface that constitutes a plane in which the optical sighting line fixed upon the glass body, coincides, and by having upon a cover plate immediately above this upper surface of the glass body, at least one sighting notch lying above the optical sighting line and cut to such a depth in the cover plate that its apex comes as near as possible into coincidence with the optical sighting line of the glass body.

Figure 1:
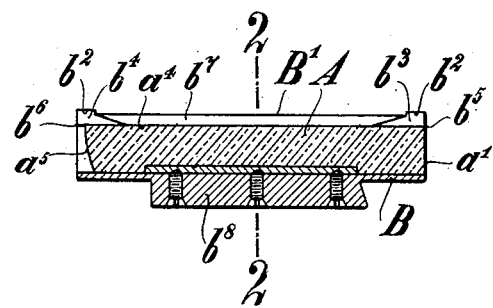
Figure 2:
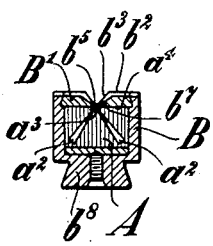
Figure 3:
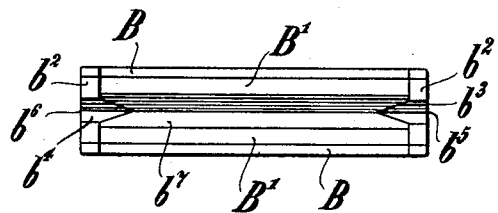

In the accompanying drawing, which illustrates one embodiment of the subject matter of the invention by way of illustration, Figure 1 is a longitudinal section through the sight; Fig. 2 is a transverse section taken on the line 2—2 of Fig. 1 and seen from the left; and Fig. 3 is a top view of the sight, corresponding to Fig. 1.

A designates the bar-shaped glass body having a rectangular cross section. The end surface $a^1$ (Fig. 1) of the glass body, which is presented toward the target, constitutes a plane perpendicular to the longitudinal axis of the glass body and is provided with a sighting mark, which consists of two upwardly converging wedge-shaped stripes $a^2$ (Fig. 2). The two stripes $a^2$ lie symmetrically to the middle longitudinal plane of the glass body A and rest with their points at the point $a^3$ which is in a plane constituting the upper surface $a^4$ of the glass body.

The sighting mark is so produced that all that portion of the surface $a^1$ lying outside of the wedge-shaped stripes $a^2$, is provided with opaque surfacing. The end surface $a^5$ (Fig. 1) of the glass body A, opposite to the surface $a^1$, is curved and constitutes a spherical surface whose center lies in the line of intersection of the middle longitudinal plane of the glass body A with its upper surface $a^4$. The curve-radius of the spherical surface $a^5$ is so determined, in a known manner, that to the eye of an observer looking through the spherical surface $a^5$ in the glass body A, the image of the sighting mark appears unobstructed. By the described arrangement, there is fixed upon the glass body A, an optical sighting line, which coincides with the line of intersection of the point $a^3$ of the sighting mark and the center of the spherical surface $a^5$ and therefore, like these two points, lies in the upper surface $a^4$ of the glass body A. The glass body A is mounted, in the manner shown in the drawing, in a housing B, which is closed at top by a cover plate $B^1$ lying immediately over the upper surface $a^4$ of the glass body. The cover plate $B^1$ is provided at each end with the lowest practicable ridge $b^2$ with a sighting notch $b^3$ and $b^4$. The two notches $b^3$ and $b^4$ lie immediately over the optical sighting line of the glass body A and are cut to such depth in the cover plate that their apexes $b^5$ and $b^6$ coincide as exactly as possible with the optical sighting line of the glass body A. In the cover plate $B^1$ between the two notches $b^3$ and $b^4$, extending in the direction of the sighting line, is a V-shaped groove $b^7$ whose depth corresponds to the depth of the notches.

For securing the sight to the apurtenant, though not illustrated sighting device, there is provided a lug $b^8$ on the housing B, which is dove-tailed in cross section and which is adapted to be slid into a correspondingly formed groove in the sighting device. The sight is directed toward the target when to the eye of the director, the target point, the point $b^5$ of the notch $b^3$ presented toward the target and the image of the point $a^3$ of the sight mark of the glass body A, appear to coincide. Since in aiming, one sights across the low ridge $b^2$ of the cover plate $B^1$, and thereby observes the greatest area of the target's surroundings, an advantage of the sight constituting the subject matter of the invention is insured in that one can locate with comparative ease, targets which are difficult to be distinguished.

Obviously, the ridge $b^2$ and the sighting notch $b^4$ on the sight presented toward the eye of the aimer might be omitted without departing from the spirit of the invention. The arrangement of two sighting notches, however, is advantageous in that when the optical sighting line, for example in rainy weather, is not used, one can employ as a make-shift, the sighting line established by the apexes of the two notches on the cover plate $B^1$, for aiming.

Having thus described my invention, what I claim as new therein and desire to secure by Letters Patent is:—

1. A gun sight having a transparent body portion with a plane upper surface and a sighting mark having its point located to establish a sighting line in said surface, and a part located above the body portion and having a sighting notch with its apex substantially coinciding with the said sighting line.

2. A gun sight comprising a transparent body having a plane upper surface with a sighting mark at one end which establishes a sighting line in said surface, and a part located above the said body portion and having notches with their apexes substantially coinciding with the said sighting line.

3. A sight having a bar-shaped glass body or collimator with a sighting mark arranged upon one end surface in a manner to give an unobstructed view to the eye of the observer; said glass body having an upper surface constituting a plane in which the optical sighting line fixed upon the glass body, falls, and said sight being provided immediately above its upper surface, with a cover plate having at least one sighting notch lying above the optical sighting line and of such depth that its apex substantially coincides with the optical sighting line of the glass body.

4. A sight having a glass body or collimator with a sighting mark arranged in position upon one end thereof to secure an unobstructed view to the eye of the observer and with an upper plane surface in which the optical sighting line lies, and a cover plate lying immediately above said upper surface of the glass body, and constructed with front and rear sighting notches whose apexes are substantially in the plane of said upper surface of the glass body and in the sighting line.

The foregoing specification signed at Barmen, Germany, this 14th day of January, 1910.

HEINRICH KORRODI. [L. S.]

In presence of—
OTTO KÖNIG,
WILLY KLEIN.

---

Copies of this patent may be obtained for five cents each, by addressing the "Commissioner of Patents, Washington, D. C."